Dec. 4, 1951 G. KENOSZT 2,577,658
LUBRICATING SYSTEM
Filed Dec. 8, 1945 2 SHEETS—SHEET 2
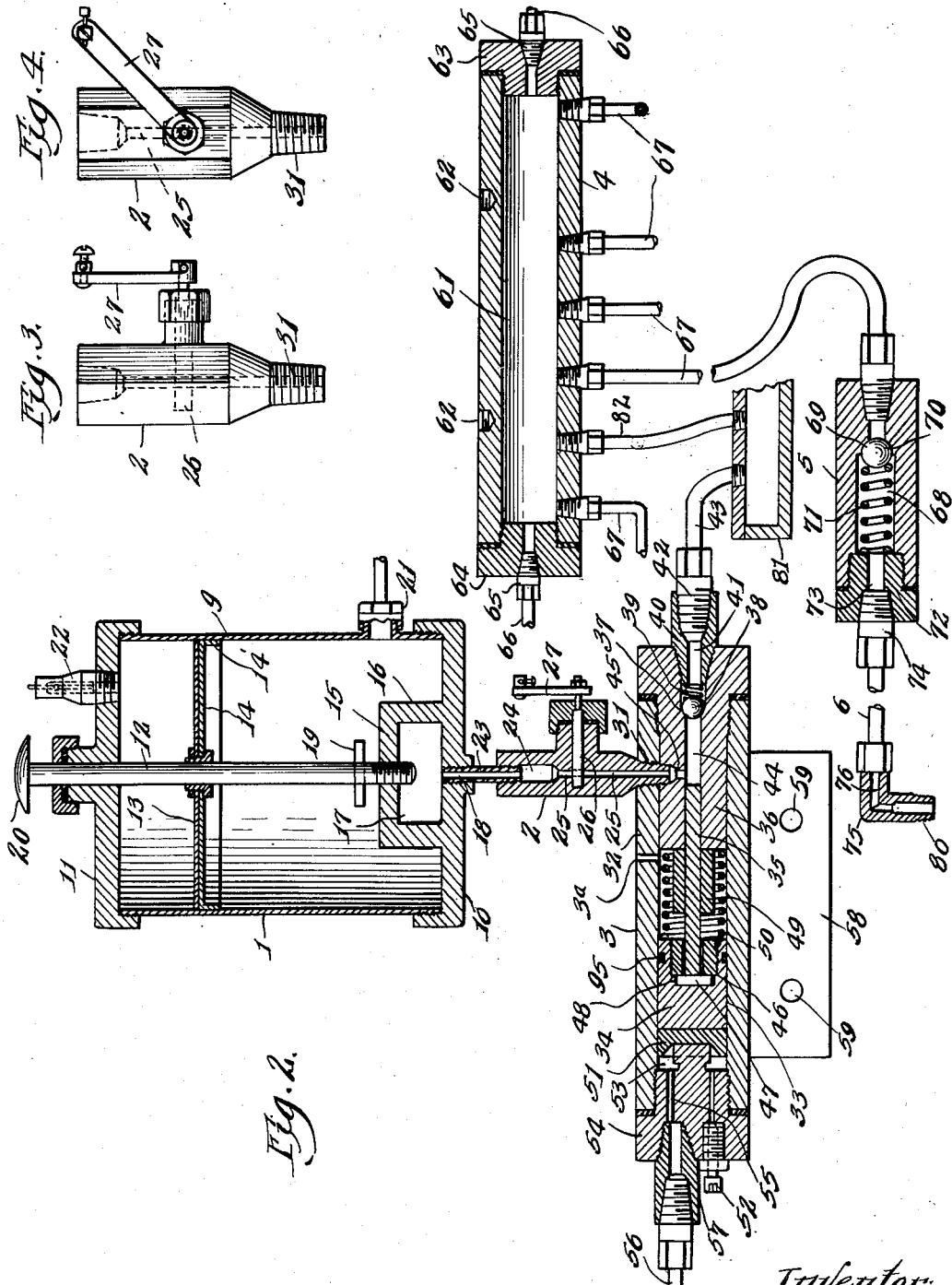
Inventor:
George Kenoszt,
Chritton, Wiles, Schroeder,
By Merriam & Hofgren
Attorneys.

Patented Dec. 4, 1951

2,577,658

UNITED STATES PATENT OFFICE 2,577,658

LUBRICATING SYSTEM

George Kenoszt, Chicago, Ill.

Application December 8, 1945, Serial No. 633,750

10 Claims. (Cl. 184—7)

This invention relates to a lubricating system and more particularly to the provision of a pressure lubrication system for automobiles, trucks, tractors, transportation conveyances, farm machinery, railroad and marine equipment or any other machinery adapted for pressure lubrication.

As is well known, one of the serious disadvantages of the use of pressure lubrication is that in many machines in which the same is used many of the bearings or other places to which the lubricant is to be directed become so worn that too much of the lubricant would be forced out of such worn bearings or the like, to starve the normal bearings or other units requiring lubrication. This I have overcome in the present invention by providing means in which such waste of lubricant is avoided, means being provided whereby a proper amount of lubricant will be forced to each of the parts requiring lubrication.

Among the objects of my invention are: to provide a novel and improved pressure lubrication system; to provide a lubricating system in which high pressures are created and used to force lubricant to stubborn parts and overcome any restriction in the passages or lines, and which will not foul up from long periods of idleness and will be ready for instant use at any time; to provide a lubricating system in which the parts of the machine may be lubricated by operation of the braking mechanism; to provide novel means for stepping up the pressure used in a lubricating system; to provide a novel arrangement of restrictors which allow a high pressure to continuously develop even though a lubricated unit is so worn that without a restrictor all or most of the lubricant would be forced out and starve the normal units requiring lubrication; to provide novel means for controlling and actuating a high pressure lubricating system; to provide novel means for multiplying the pressure applied in a lubricating system; to provide a novel form of grease pump; to provide a novel combination of lubricant container, grease gun, manifolds and restrictors in a lubricating system; to provide a pressure lubricating system capable of being applied to any machine, vehicle or conveyance; and such further objects, advantages and capabilities inherently possessed by my invention as will later more fully appear.

My invention further resides in the combination, construction and arrangement of parts illustrated in the accompanying drawings, and while I have shown therein for illustrative purposes only, preferred embodiments, I wish it understood that the same are susceptible of modification and change without departing from the spirit of my invention.

In the drawings:

Fig. 2 is a vertical section, partly broken away, of certain portions of the system shown in Figure 1.

Fig. 3 is a side elevation showing the inlet valve and means for operating the same.

Fig. 4 is a side elevation looking toward the right hand side of Fig. 3.

Figure 1:
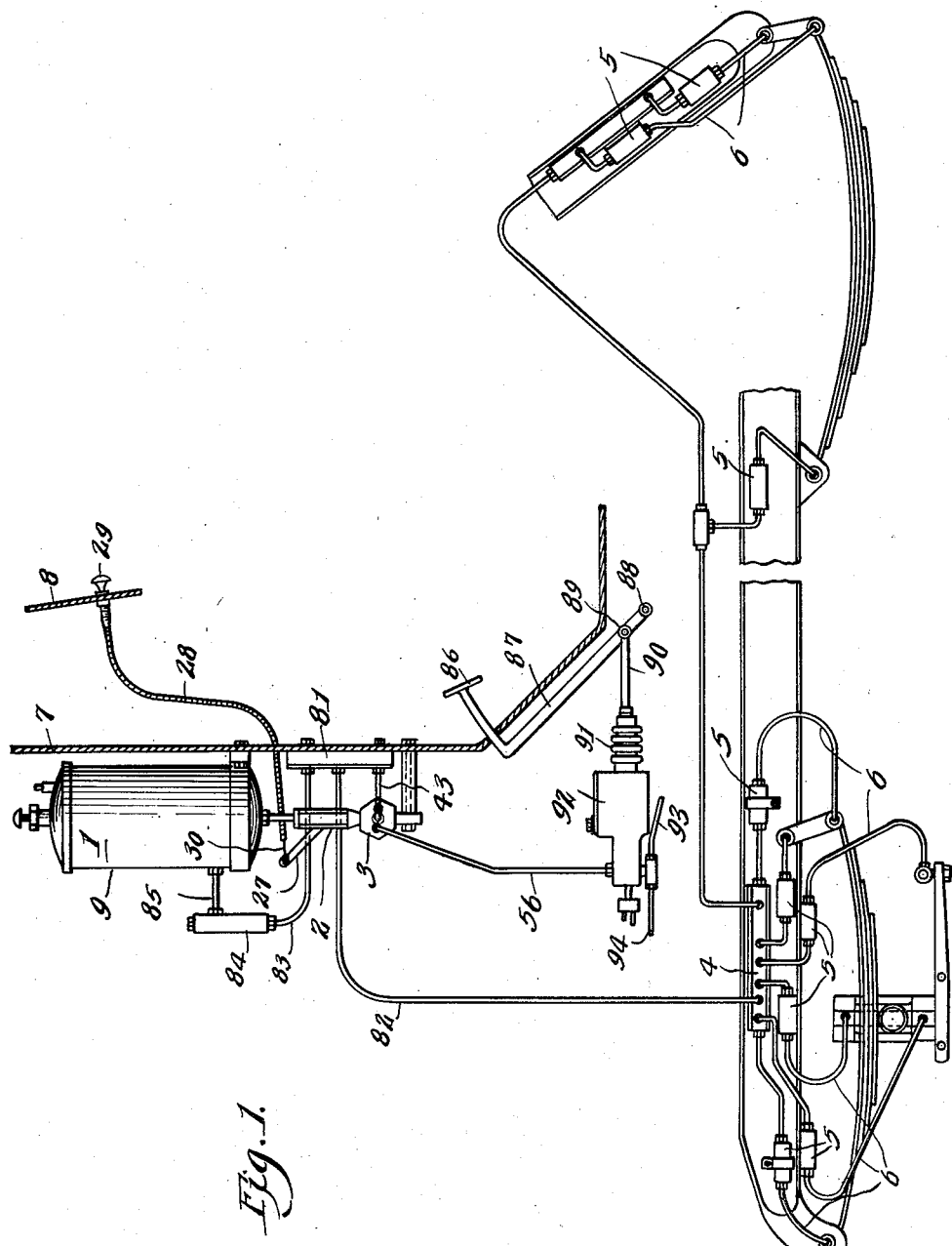
Fig. 1 is a side elevation of my lubricating system as applied to an automobile or other machine having braking means.

The lubricating system of the present invention is intended for pressure lubricating the bearings, or other parts requiring lubrication, in any vehicle, machine or conveyance to which it is adapted, which is provided with hydraulic, pneumatic, steam or other power for operating the grease pump.

In the form shown in the drawings my pressure lubricating device comprises generally a lubricant container 1, an inlet valve member 2, a grease pump 3, a manifold 4, a plurality of restrictors 5, and suitable piping 6, for conducting the lubricant from the restrictors to the bearing or other unit to be lubricated. As shown in Fig. 1, when the lubricating system is to be applied to an automobile or the like, the container 1 is fixed in any suitable manner to the front wall 7 in front of the instrument board 8. This lubricant container comprises the cylindrical walls 9 screw threaded or otherwise fixed at the bottom to a base member 10 and having at its top a removable cover 11. Mounted for longitudinal sliding movement in cover 11 is a piston rod 12 upon which is mounted for longitudinal sliding movement a piston head 13 having fixed to its bottom face an element 14 of leather, textile or other suitable flexible material, having down turned edges 14' to serve as a seal to prevent lubricant from passing upwardly around the periphery of the piston head.

Piston rod 12 is screw threaded into the wall or cross member 15 fixed to or integral with the side members 16, to provide a chamber or yoke 17 open to the interior of the container below the piston head, whereby when the piston head moves downwardly it will force lubricant from the interior of the container through chamber 17 into the pipe 18 leading to the inlet valve 2. Piston rod 12 near its lower end is provided with a laterally extending pin 19 so that when it is desired to move the piston head upwardly for any purpose, the piston rod 12, which has an upper grasping head 20, may be unscrewed from the wall 15 and moved upwardly until pin 19 strikes the under portion of the piston head, further continued movement raising the piston head as will be readily understood. This might be desired for various purposes such as for example, enabling removal of the cover 11 and the piston head 13, and the filling of the container with lubricant, after which the piston head may be reinserted into the container, the cover 11 screwed back in place, and the bottom end of the piston rod 12 again screwed into the upper wall 15 of the chamber 17. Any other means desired may be used for filling the container with lubricant, such for example as a one-way valve member 21 provided in the lower portion of the side wall of the container, and the container loaded by forcing lubricant through such one-way valve until the desired amount of lubricant is forced into the container. This one-way valve member is a check valve or the like of conventional type, and will prevent said lubricant from being forced out through the filling valve 21.

In the container shown in Fig. 2 the piston head 13 can be forced downwardly against the lubricant to force the same through the inlet valve 2 by any suitable means. This is accomplished in the structure shown in Fig. 2 by an air charging valve 22, having a suitable check valve, and connected with any suitable source of air under pressure, whereby air may be forced into the upper portion of the container above piston head 13, to create a downward pressure on the piston head of sufficient degree that when the inlet valve in the inlet valve member 2 is open, such lubricant will pass therethrough as later more fully described. Any other suitable means may be used for forcing the piston head downwardly against the lubricant in the container, as well as for filling lubricant into the container. It is preferable, however, to, at all times, have pressure exerted upon the piston head for forcing lubricant through the inlet valve member 2 when the inlet valve therein is opened, although this pressure may be relatively low.

The inlet valve member 2 in its upper portion is provided with a chamber 24 in communication with the pipe 18 and communicating at its bottom end with a smaller passageway 25, which continues downwardly through the remaining length of the inlet valve member. Rotatably mounted in the body of the inlet valve member is a shaft 26 having a lateral opening therethrough so that when the shaft 26 is rotated to bring this opening in registry at both ends with the passageway 25, lubricant may be forced downwardly therethrough. Rotation of shaft 26 is effected by a lever 27 fixed thereto, which lever at its upper end is connected with a wire 30 slidably mounted in the tubular cable 28 fixed to the instrument board 8, said wire being fixed to the handle 29 so that when this handle is moved in or out the flexible wire will move lever 27 to open or close the valve opening in shaft 26 as desired.

Inlet valve member 2 at its lower end is reduced in diameter and provided with screw threads to be screwed into the opening 31 in the wall 32 of the grease pump 3. This grease pump is formed with an internal bore 33 in which is longitudinally slidable a piston 34 to which is fixed to move therewith a plunger 35 of a diameter considerably less than that of the piston 34. Plunger 35 is longitudinally slidable in a longitudinal opening in a stem 36 screw threaded in the right hand end of the grease pump as seen in Fig. 2. The longitudinal opening in stem 36 is provided with an enlarged space forming a spherically shaped seat 37 to receive ball 38 which is normally held thereagainst by a spring 39 which at its other end abuts against an outlet member 40 screw threaded into the end of the stem 36. The outlet member 40 is formed with a passageway 41 communicating with an aligned passageway in the connection 42, to which connection is secured a pipe, tubing or the like 43. From this it is seen that between the outer end of plunger 35 and the ball 38 is a chamber 44 which when the outer end of plunger 35 is moved to the left as viewed in Fig. 2 is in communication with the passageway 25 by reason of the laterally extending opening 45 connecting the same with chamber 44.

The plunger 35 is fixed to piston 34 by means of a sleeve 46 screw threaded into a complemental threaded opening in the piston 34, the plunger having at its inner end a head 47 seated in a depression 48 and held therein by the sleeve 46. There is some clearance around the head 47 and between the stem of the plunger 35 and the bore through the sleeve 46 so that proper alignment may take place despite any machining irregularities, the sleeve 46 being locked appropriately in such position as to hold the head 47 in place axially while permitting slight sidewise movement if necessary for alignment. Surrounding the plunger 35 is a sleeve 49 which serves as a spacer block for limiting the length of stroke of piston head 34, it being pointed out that the sleeve 49 slidably receives the plunger and at its right hand end bears against the left hand end of the stem 36 as viewed in Fig. 2. Surrounding sleeve 49 is a coil spring 50 bearing at one end against the stem 36 and at the other end against the piston head 34 so as normally to urge the piston head to the left as viewed in Fig. 2 when the piston head driving pressure is released. This movement to the left moves the free end of the plunger to the left of the port 45 to permit passage of lubricant from the container through the inlet valve member 2 into the chamber 44. The free end of plunger 35 is formed to have a close sliding fit in the bore 44 so as to eliminate the need of a seal on this end of the plunger. If desired a seal may be used at this end of the plunger to eliminate the necessity of a high degree of machining of these moving parts.

The left hand side of piston head 34 has associated therewith a piston seal 51 of any suitable material to use in the presence of the particular hydraulic brake fluid or other fluid being used. Cylinder head 54 is provided with an inlet bleeder valve 52 for the purpose of venting the space 53 behind the piston head 34 when desired. The cylinder head 54 is provided with a longitudinally extending opening 55 connecting the passageway in the pipe line 56 through connection 57 to the space 53, whereby fluid under pressure may be admitted therethrough for driving the piston head 34 as will be later more fully explained. The grease pump cylinder 32 has fixed thereto a flange 58 having openings 59 for mounting the same on any suitable part of the machine as desired. The cylinder of the pump 3 also has a vent hole 3a to prevent pressure or vacuum conditions in the space between piston head 34 and stem 36. As will be understood in Fig. 2 further entry of lubricant into space 44 will be prevented when the free end of the plunger 35 is moved in a forward direction beyond opening 45, after which the lubricant in space 44 will be put under high pressure as later more fully explained.

Pipe 43 which leads from the outlet valve 38, in the form shown in Fig. 2, connects with distributor 81 (see Fig. 1) and pipe 82 to the interior space 61 of the manifold 4. The manifold 81 may also have connection with a pipe 83 leading to a restrictor 84 connecting by pipe 85 back to the interior of the lubricant container 1 for permitting, for safety reasons, discharge of excess lubricant back into the lubricant container. The manifold 4 may be mounted upon any suitable part of the machine by screws secured in threaded openings 62. Manifold 4 is closed at its two ends by heads 63 and 64 through each of which extends a passageway and suitable connection 65, from each of which connections extends a pipe 66 leading to a restrictor opening to a bearing or other part to be lubricated. Also connected in one of the side faces of the manifold are a plurality of threaded holes within each of which is mounted a connection from which extends a pipe 67 leading to a restrictor and then to a bearing or other part to be lubricated. Connected in any desired point of the length of each of pipes 67 is one of the restrictors 5, each of these restrictors having an inner chamber 68 formed at one end with a ball seat 69 against which is seated a ball 70 normally urged against its seat by spring 71, which spring bears at one end against the ball and at the other end against the head 72 screwed or otherwise secured to the end of the restrictor. Passing through head 72 is an opening 73 in which is mounted a connection 74 for receiving the pipe 6 which leads to a fitting 75 of either straight or angular formation as desired, and having therein an opening 76 communicating, through the threaded end 80 connected in any desired manner to the bearing or other part to be lubricated, to the point to which lubricant is to be delivered.

The lubricating system of the present invention is shown as embodied in an automobile or the like, for lubricating the various bearings or other parts requiring lubrication. Such lubrication is effected by pressing downwardly on the brake pedal 86, formed of lever 87 fulcrumed at 88 to any desired point of the chassis, or other part of the machine. Fulcrumed at 89, near the fulcrum 88, is a connecting rod 90 passing through a sealing member 91 and thence to the interior of the conventional brake cylinder 92 having therein a longitudinally movable piston rod which when the brake pedal is depressed forces a braking fluid through pipe 56 to the space 53 back of the piston head seal 51 of the grease pump 3. Longitudinal movement of the piston head (not shown) in the brake cylinder, which is of conventional type, forces the braking fluid through pipes 93 and 94 to desired locations in the automobile or other machine for applying the conventional brakes therein.

This invention has been described, for illustrative purposes only, as it pertains to the high pressure lubrication of an automobile, utilizing pressure generated by the hydraulic braking system to operate a lubricant pump piston which forces a small plunger against spring pressure into a close fitting cylinder. The pressures existing in the high pressure side of the conventional hydraulic braking system are of the order of 600 to 1,000 pounds per square inch. When using a diameter of the piston head 34 of 0.750 inch and a diameter for the plunger 35 of 0.187 inch, a system embodying my invention has developed, with normal brake pedal pressure, a lubricant pressure at the free end of the plunger 35 of 12,000 pounds per square inch. Also by constructing the coil springs 71 in the restrictors 5 to have the desired strength, the restrictor balls 70 can be held against their seat and released by lubricant pressure to permit passage of lubricant thereby under any pressure desired, determined by the spring pressure selected. From this it will be seen that I may use the brake pedal lever 87 for a first force multiplication which is followed by another force multiplication in the grease pump to effect very high grease pressures. Also the separate restrictors at each outlet assure uniform distribution of grease, and prevent all of the grease from going out of a loose bearing. Any desired lubricant may be used, as for example cup grease or other suitable grease. As will be understood, by proper proportioning of the parts, any high pressure desired may be obtained.

In the operation of my lubricating system, and assuming the lubricant container 1 to be filled with lubricant and having a suitable pressure applied thereby back of the piston head 13, a pull of the operating handle 29 on the instrument panel, will pull the wire 30 to move lever 27 which will rotate shaft 26 to bring its opening into alignment with passageway 25 and with the plunger 35 of the grease gun retracted lubricant will be forced into space 44. Pressure downwardly upon the brake pedal will, through the action of the brake cylinder, force braking fluid into the space 53 back of piston head seal 51, forcing this seal and piston 34 forwardly under resistance of spring 50, which forward movement will cut off further flow of lubricant into space 44 and compress said lubricant under high pressure due to the diameter of plunger 35 being much smaller than piston head 34. When the pressure on the lubricant in space 44 has reached an amount for which the spring 39 is set, normally only a few pounds per square inch (the arrangement here is merely a check valve), the ball 38 will unseat and permit lubricant under pressure to flow to distributor or manifold 81 and then to manifold 4, high pressure being built up because of the resistance provided by the restrictors 5.

High pressure lubricant flows through pipes 67 to the restrictors 5, and when the pressure of the lubricant reaches an amount as controlled by coil springs 71, as for example 10,000 pounds per square inch, each of the balls 70 of the restrictors will be moved off of their seats simultaneously and permit high pressure lubricant to flow through pipes 6 to the grease fittings 75. When the entire system is loaded with lubricant up to the restrictors, from high pressures built up as described above, I am enabled to force lubricant into close fitting parts and at the same time prevent undue loss of lubricant from loose bearings, control of lubricant movement being by the restrictors and being independent of the condition of the various parts being lubricated. In the system shown and described I have achieved very desirable results by limiting the stroke of piston 34 and plunger 35 to 0.250 inch so that the hydraulic fluid displacement would not interfere with the normal operation of the hydraulic brake system. By forming sleeve 49 of the grease pump of any desired length I am enabled to limit the length of stroke of the combined piston and plunger to any amount desired. If desired, this stroke can be limited to smaller values thus forcing smaller slugs of lubricant through the system.

It should be remembered that if the inlet valve 2 is open, a slug of lubricant is forced through the system every time the brakes are applied, and that the high pressures developed force lubricant to stubborn parts. The lubricant container 1 can be a part of the complete system or separate from it and piped to it as desired. The container can be a plain cylinder closed at the top and bottom and provided with a suitable lubricant charging valve and lubricant outlet valve, and the lubricant container, if desired, may be provided with a mechanical device for forcing the lubricant out of the container and into the lubricating device. The trapped air above the piston can be used to force the lubricant into the lubricating device, or, preferably, the air valve 22 can be used to apply air pressure back of the piston 13 to force the piston forwardly, and cause lubricant to pass through the valve member 2 when it is open. Piston 34 may also be provided with piston rings 95 to enable steam to be used when desired back of the piston head.

While I have described herein the use of a hydraulic brake fluid for operating piston 34 it will be understood that any suitable means providing sufficient force may be applied to cause forward movement of piston 34, coil spring 50 returning the piston head and plunger when the pressure against the piston has been released. For example, compressed air may be used for operating the grease pump, the compression pressure from the combustion chamber of an internal combustion engine, or a powerful mechanical linkage. From the above it will be seen that many modifications may be utilized for operating the grease pump without departing from the spirit of my invention.

I have accomplished satisfactory results by having the restrictors 5 set to pass lubricant at 4500 pounds per square inch and the restrictor 84 set for safety reasons to discharge lubricant at 5,000 pounds per square inch back into the lubricant container. As will be understood these various pressures may be set to any amounts desired within the limits of the apparatus and as are suitable to the conditions present in the apparatus being lubricated.

I claim:

1. Apparatus for pressure lubrication of machinery having hydraulic brakes, comprising: a brake system including a cylinder containing brake fluid; a brake pedal for operating the brake system; a lever for multiplying the force applied to said pedal; a lubricant pump having a piston operated in a forward direction by the force of the brake cylinder fluid; means in the lubricant pump for further multiplying the force exerted by the piston; means for introducing lubricant to said further multiplying means; and piping leading from said pump to the parts to be lubricated, whereby each of said parts will receive a slug of lubricant each time the brake is applied.

2. Apparatus for high pressure lubrication of power vehicles, comprising: a lubricant pump having a piston operated by fluid pressure of substantial amount; a hydraulic brake system in said vehicle, such system including a brake pedal for providing a fluid pressure acting upon the piston; means for introducing lubricant into the lubricant pump; and means in said pump for delivering lubricant under pressure greatly increased over that acting upon the piston.

3. Apparatus for pressure lubrication in power machinery, comprising: a lubricant supply; a lubricant pump having a piston reciprocable in a relatively large bore in a cylinder, and a plunger fixed to the piston to reciprocate therewith, the plunger being longitudinally reciprocable in a smaller bore in the cylinder; a hydraulic brake system for said machinery, such system including a brake pedal and brake fluid for applying pressure for driving the piston forwardly; a valve between the lubricant supply and the lubricant pump; remotely located means for selectively operating said valve to permit entry of lubricant into the smaller bore ahead of the plunger; and a spring loaded check valve in the outlet end of the smaller bore for preventing outlet of lubricant therefrom until the pressure created thereon by the plunger has reached a predetermined amount.

4. Apparatus for pressure lubrication in power machinery, comprising: a lubricant supply; a lubricant pump having a piston reciprocable in a relatively large bore in a cylinder, and a plunger fixed to the piston to reciprocate therewith, the plunger being longitudinally reciprocable in a smaller bore in the cylinder; a hydraulic brake system for said machinery, such system including a brake pedal and brake fluid for applying very high pressure for driving the piston forwardly and a compression spring for moving the piston rearwardly upon release of the driving fluid thereagainst; a valve between the lubricant supply and the lubricant pump; remotely located means for selectively operating said valve to permit entry of lubricant into the smaller bore ahead of the plunger; and a spring loaded check valve in the outlet end of the smaller bore for preventing outlet of lubricant therefrom until the pressure created thereon by the plunger has reached a predetermined amount.

5. Apparatus for simultaneous high pressure lubrication of a plurality of points in a machine, comprising: a grease supply; a grease pump adapted to receive grease from said grease supply and deliver it to an outlet at a pressure of at least several thousand pounds per square inch; conduits connecting said outlet to said plurality of points to be lubricated; and restrictors for preventing delivery of grease to said points until the pressure in the conduits is at least several thousand pounds per square inch, there being a restrictor in each conduit leading to a point to be lubricated and each restrictor comprising a high pressure check valve, the pressure at which all of said check valves open being substantially identical and many times the pressure required to pass grease through the normal point to be greased.

6. In a vehicle, apparatus for simultaneous high pressure lubrication of a plurality of points, comprising: a lubricant supply; a lubricant pump adapted to receive lubricant from said lubricant supply and deliver it to an outlet at a pressure of at least several thousand pounds per square inch; conduits connecting said outlet to said plurality of points to the lubricated, and restrictors for preventing delivery of lubricant to said points until the pressure in the conduits is at least several thousand pounds per square inch, there being a restrictor in each conduit leading to a point to be lubricated and each restrictor comprising a high pressure check valve, the pressure at which all of said check valves open being substantially identical and at least several thousand pounds per square inch and the pump being capable of delivering a pressure substantially in excess of said check valve-opening pressure.

7. Apparatus for high pressure lubrication of various parts, comprising; means for providing a first multiplication of force to be exerted against a lubricant to be passed through a lubricating system; means for further multiplying the first mentioned force to drive the lubricant to the parts to be lubricated under a pressure of several thousand pounds per square inch; a valve for selectively preventing passage of lubricant to said second force multiplying means; a plurality of passageways connecting said second force multiplying means with the parts to be lubricated; and means in each passageway comprising high pressure check valves for preventing flow of lubricant to the respective part until pressure on the lubricant reaches several thousand pounds per square inch.

8. Apparatus for high pressure lubrication of various parts, comprising: means for holding a supply of lubricant; a lubricant pump connected to said supply means and having a differential piston operated by fluid pressure of substantial amount; manually operable means in said connection for permitting passage of lubricant from said supply means to said pump; a plurality of passageways connecting said pump with the parts to be lubricated; and a restrictor in each of said passageways comprising a high pressure check valve for preventing flow of lubricant to the respective part until the pressure on the check valve reaches several thousand pounds per square inch.

9. Apparatus for high pressure lubrication of various parts, comprising: a pressure multiplying grease pump having a differential piston operated by fluid pressure of at least several hundred pounds per square inch; means for introducing grease into the grease pump; a plurality of passageways connecting said pump with the parts to be lubricated; and a restrictor comprising a high pressure check valve in each of said passageways for preventing flow of grease to the respective part until the pressure on the check valve is of the order of 4,000 pounds per square inch.

10. Apparatus for high pressure lubrication of various parts comprising: means for providing a first multiplication of force to be exerted against grease to be passed through a lubricating system; means for further multiplying the first mentioned force to drive the grease to the parts to be lubricated under a pressure of the order of 10,000 pounds per square inch; a valve for selectively preventing passage of grease to said second force multiplying means; a plurality of passageways connecting said force multiplying means with the parts to be lubricated; and means in each passageway comprising high pressure check valves for preventing flow of grease to the respective parts until pressure on the grease reaches several thousand pounds per square inch.

GEORGE KENOSZT.

REFERENCES CITED

The following references are of record in the file of this patent:

UNITED STATES PATENTS

| Number | Name | Date |
| --- | --- | --- |
| 256,807 | Miller | Apr. 18, 1882 |
| 550,887 | Holt | Dec. 3, 1895 |
| 1,767,511 | Carr | June 24, 1930 |
| 1,789,195 | Sagle | Jan. 13, 1931 |
| 1,879,086 | Chisholm | Sept. 27, 1932 |
| 1,919,118 | Millington | July 18, 1933 |
| 1,987,256 | Johnson | Jan. 8, 1935 |
| 2,032,036 | Zerk | Feb. 25, 1936 |
| 2,245,860 | Hunting | June 17, 1941 |
| 2,285,407 | Bijur | June 7, 1942 |

FOREIGN PATENTS

| Number | Country | Date |
| --- | --- | --- |
| 10,445 | Great Britain | 1910 |